April 25, 1967     J. E. WIDNER     3,315,691

VEHICLE POWER WASHING APPARATUS

Filed Nov. 13, 1964     3 Sheets-Sheet 1

INVENTOR.
James E. Widner
BY
Fishburn and Gold
ATTORNEYS

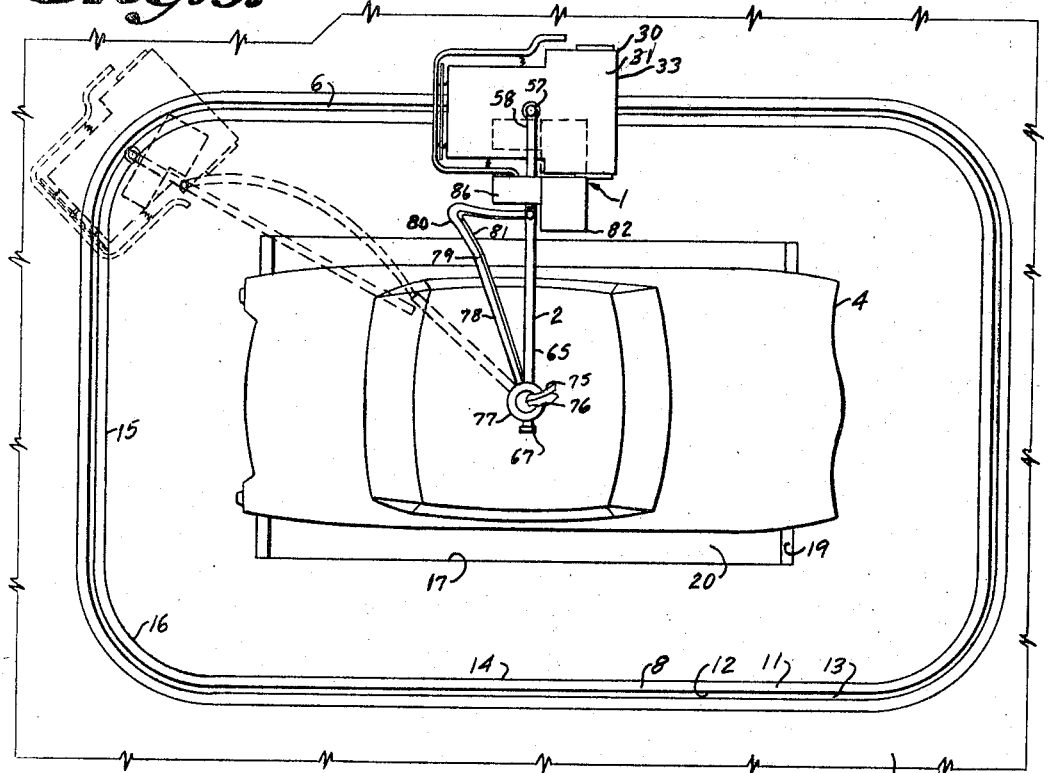

April 25, 1967 J. E. WIDNER 3,315,691
VEHICLE POWER WASHING APPARATUS
Filed Nov. 13, 1964 3 Sheets-Sheet 3

INVENTOR.
James E. Widner
BY
Fishburn and Gold
ATTORNEYS

United States Patent Office 3,315,691
Patented Apr. 25, 1967

3,315,691
VEHICLE POWER WASHING APPARATUS
James E. Widner, Prairie Village, Kans., assignor to Robo-Wash, Inc., Kansas City, Mo., a corporation of Missouri, and Citation Manufacturing Company, Inc., Siloam Springs, Ark., a corporation of Arkansas
Filed Nov. 13, 1964, Ser. No. 410,875
10 Claims. (Cl. 134—57)

This invention relates to vehicle washing apparatus, and more particularly to power wash apparatus adapted to wash automobiles and other vehicles by subjecting exterior body surfaces of the vehicle to sprays of water and detergents.

The principal objects of the present invention are to provide an improved vehicle washing apparatus which may be operated automatically for directing a plurality of sprays which collectively are adapted to project substantially a sheet or curtain of water upon a vehicle in directions transversely thereof or generally normal to the vehicle surface and advance the sheet or curtain of water along a path around the vehicle; to provide such a structure which includes a mobile frame or carriage supported for rolling movement over a surface with a track and guide means for steering the carriage so it moves in an orbit about a vehicle washing position with a spray unit supported on the carriage and positioned laterally thereof adjacent a vehicle washing position for directing sprays to impinge upon the body surface contours of a vehicle being washed as the carriage moves therearound; to provide such a structure wherein the spray unit is swingably mounted on the carriage and is swung rearwardly in accordance with the curve of the path of the carriage as it moves around the corners between the sides and ends of the vehicle to assure complete coverage thereof by the sprays; to provide such a structure that includes a coin-responsive mechanism in a housing that is positioned adjacent the side of a vehicle in the vehicle washing position and an electric circuit and mechanism that is actuated by suitable coins to move the housing to a retracted position and then to effect the spraying action and moving of the carriage in the orbits about the vehicle; to provide a vehicle washing apparatus embodying control means which include shut-off means for automatically stopping the carriage and sprays at the end of a predetermined number of cycles or orbits; and to provide a power wash apparatus that is of simplified construction, easily actuated and efficient in operation for washing vehicles.

Other objects and advantages of this invention will become apparent from the following description taken in connection with the accompanying drawings wherein are set forth by way of illustration and example certain embodiments of this invention.

FIG. 3 is a plan view of the vehicle washing apparatus with the carriage and spray unit shown in solid lines in a position prior to starting of the washing and the position of the carriage and spray unit as it moves around a corner of the path of the travel shown in broken lines.

FIG. 4 is an enlarged side elevation of the carriage and coin unit housing with portions broken away to illustrate the drive and steering of the carriage.

Figure 1:
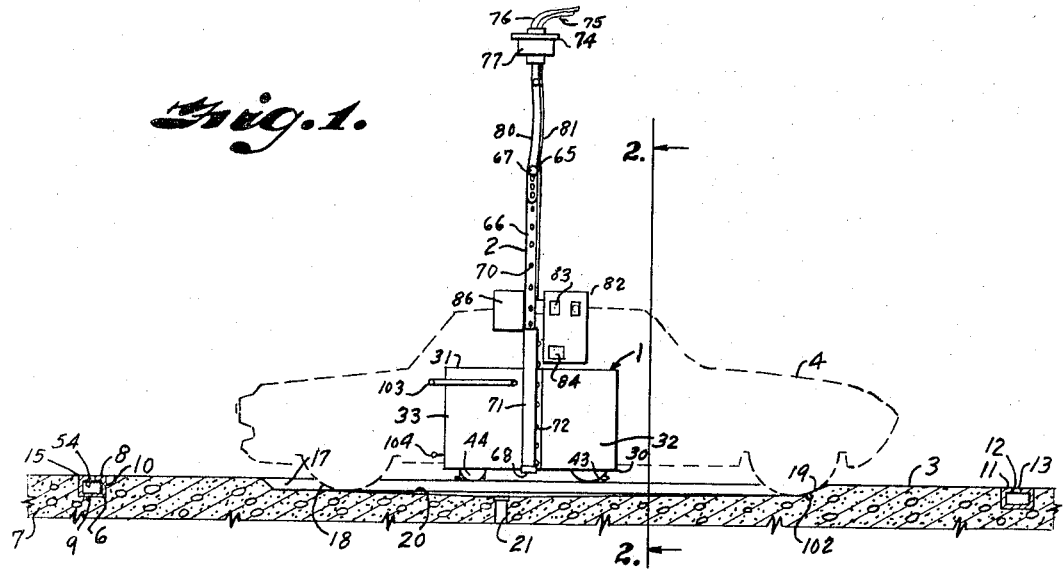
FIG. 1 is a vertical sectional view through the vehicle washing apparatus of this invention taken on the line 1—1, FIG. 2, with the vehicle washing position illustrated in broken lines.

Referring more in detail to the drawings:

1 designates a mobile carriage supporting a spray unit 2 and movable on a supporting surface 3 in a defined path about a position for a vehicle 4 to be washed. In the structure illustrated, the carriage has guide means 5 that engages or follows a track 6 which is continuous around and spaced outwardly of the vehicle wash position. In the structure illustrated, the track 6 is preferably embedded in the floor 7 so the upper surface 8 of the track is level with the floor surface 3. The track is illustrated as being generally U-shaped having a bottom wall 9 with spaced apart upstanding legs 10 having inturned flanges 11 arranged at the upper ends thereof. The flanges 11 have inner edges 12 that are spaced apart forming an opening 13 that is continuous around the entire track for portions of the guide means 5 to extend therethrough. The track preferably has straight side portions 14 and straight end portions 15 to define a generally rectangular path wherein the straight portions are connected at the corners by curved or arcuate portions 16, as illustrated in FIG. 3. It is preferred that in the vehicle wash position, the floor 7 have a recessed portion 17 of suitable width and length whereby the wheels 18 of the vehicle will rest inside of the recess with the forward wheels against the forward end 19 of the recess 17. It is also preferred that in the recess the surfaces 20 are inclined toward a drain connection 21 so that water, detergent and the like used in the washing of the vehicle will tend to move into the recessed portion and flow to the drain and then to a suitable disposal such as a sewer or the like.

The carriage 1 preferably includes a mobile frame 22 that is generally rectangular and has side members 23 connected at lower portions by a plurality of spaced transverse members 24, 25, 26 and 27. The frame side members are connected at upper portions by spaced transverse members 28. The frame 22 includes suitable extensions 29 to support a casing or shell 30 that has a top wall 31, side walls 32 and end walls 33, which together form an open bottom enclosure. A rear axle structure 34 extends transversely of the frame and is mounted in support brackets 35 carried on lower side portions of the side frames 23. The axle structure 34 includes a housing 36 enclosing a differential gearing (not shown) having an input shaft 37 that is suitably connected by power transmission means to a motor 38 which drives same. In the structure illustrated, the motor 38 is supported on the frame 22 and has a shaft 39 mounting a pulley 40 operatively connected by a belt 41 with a pulley 42 fixed on the differential input shaft 37. The differential operatively connects the power input with rear wheels 43 suitably mounted on the axle 34 to support the rear of the carriage and propel same in response to operation of the motor 38.

The forward end of the carriage is supported on front wheels 44 which, in the structure illustrated, includes a plurality of individually rotatable wheels mounted on an axle 45 that extends laterally outwardly from a guide support structure 46. In the structure illustrated, the forward portion of the frame 22 is offset upwardly from the rear portion and the guide support structure 46 is rotatably mounted on said forward portion in depending relation for rotation about a vertical axis. The structure includes laterally spaced plates 47 carrying the axle 45 with the upper and lower ends of the plates 47 connected as by channel members 48. A top plate 49 has bearing engagement with a plate 50 carried on the frame 22 with a spindle 51 providing the rotatable connection between the guide support 46 and said frame 22 whereby the guide support is rotatable about the axis of the spindle 51.

The guide means 5 includes a leg 52 which is fixed on the guide support 46 and depends therefrom extending through the slot or opening 13 between the flanges 11 of the track 6. Rollers 53 are mounted on opposed sides of the leg 52 and engage the lower surface 54 of the flanges 11 and there is a forwardly extending arm 55 on the guide support 46 that rotatably mounts a roller 56 in depending relation whereby the roller 56 is positioned between the edges 12 of the flanges 11 to have rolling engagement therewith so as to hold the guide support 46 and front wheels in a suitable position to steer the carriage 1 along the path defined by the track 6, the roller 56 an arm 55 effecting a pivotal movement of the front wheel about the axis of the spindle 51 as the carriage moves around the curved portions 16 of the track.

A post 57 is mounted on the carriage preferably in substantially upright relation and has an arm structure 58 that extends laterally of the carriage toward the vehicle wash position, the spray unit 2 being supported by said arms. It is preferred that the post 57 be rotatable and, in the structure illustrated, the frame 22 includes a tubular guide or mounting member 59 into which the post 57 is sleeved, said post extending below the lower end of the tubular member as at 60. A collar 61 is fixed on the post 57 and rests on the upper portion of the tubular mounting member 59 to rotatably support the post 57. When the front wheels are in straight-away position, the arm 58 extends substantially at right angles to the respective straight portion of the track on which the carriage is mounted. It is desired to swing the arm rearwardly as the carriage moves around the curve as later described. In order to effect this swinging movement, the lower end of the post 57 is connected to an arm 62 which has the outer end thereof connected by a link 63 to a free end of an arm 64 which extends from and is fixed to the guide support 46 so that as the engagement of the guide means 5 with the track 6 effects any turning of the front wheels about the axis of the spindle 51 in steering the carriage, a substantially corresponding angular turning of the post 57 will be effected.

The spray unit generally indicated by the numeral 2 moves with the carriage and is preferably supported on the arm 58. The spray unit includes an upper portion 65 that is adapted to be disposed over the top of a vehicle 4 and another portion 66 that depends from the first portion to form a generally L-shaped arrangement. In the structure illustrated, the spray unit 2 consist of a tubular member having an upright portion 66 that is fixed on the inner end of the arm 58 with the upper end of said upright portion 66 communicating with the horizontal portion 65, the end extremities 67 and 68 being closed. A fluid inlet connection 69 communicates with the interior of the tubtular member and is connected to a suitable source of fluid under pressure to deliver said fluid to the spray unit. This fluid delivery spray unit generally shaped as an inverted L is provided with a plurality of spaced-apart spray nozzles indicated by the numeral 70 for delivering fluid on to the top and one side of a vehicle in the wash position. In the structure illustrated, the lower part of the upright tubular portion 66 is enclosed in a protective cover such as a plastic tube 71 and the spray nozzles 72 in such portion extend from one side of the lower part of the portion 66 through the protective cover 71 and then are turned toward the vehicle position to direct the sprays thereagainst. This protective arrangement prevents damage to the vehicle if it should be driven against the cover 71. The spray nozzles 70 and 72 are arranged to direct fan-shaped sprays generally in a plane substantially perpendicular to the surface of the vehicle body with the sprays overlapping to form a spray curtain that impinges on the body surface.

A suitable support 74 is arranged above the floor 7 and an electrical conduit 75 and a fluid flow pipe or hose 76 from suitable sources of supply lead to a swivel connector assembly 77 having a flow pipe 78 rotatably mounted thereon in communication with the flow pipe or hose 76 whereby the fluid from the source is delivered through the pipe or hose 76 to the pipe 78. The pipe 78 is connected as at 79 to a hose 80 that forms a flow connection with the inlet 69 of the spray unit. The member 77 has electrical connections between conductors in the conduit 75 to provide respective rotative electrical connection to conductors in a conduit 81 that extends along the pipe 78, hose 80, inlet connection 69 and spray unit portion 66, and into the interior of the casing or shell 30 of the carriage 1. A supply of water and/or detergent under control of suitable valves is connected to the flow pipe or hose 76 to supply the fluid for the sprays, it being preferable that a mixture of water and detergent be first sprayed on the entire vehicle in one or more orbits of the carriage around the washing position and then water alone be supplied to spray a rinse over the vehicle during one or more orbits to thoroughly remove the detergent and loosened dirt from the vehicle surfaces. Also, it is preferable that hot or warm water be used with the detergent and cold water for the rinse.

Figure 2:
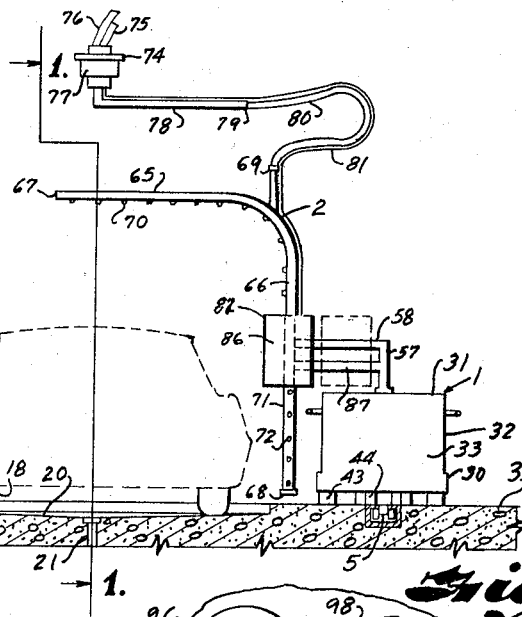
FIG. 2 is a vertical sectional view through the apparatus taken on the line 2—2, FIG. 1, the carriage and spray unit being shown in rear elevation and a vehicle shown in broken lines in the washing position.
Figure 7:
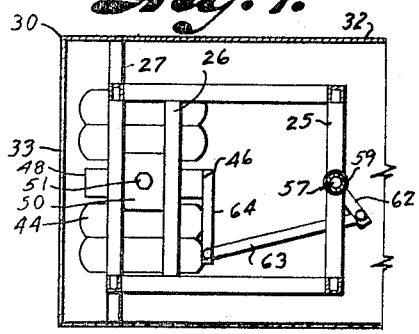
FIG. 7 is a horizontal sectional view through the carriage on the line 7—7, FIG. 4.
Figure 8:
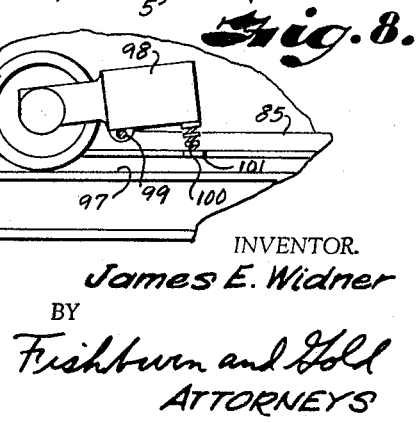
FIG. 8 is a partial enlarged elevation of the spray unit arm and housing drive thereon.
Figure 5:
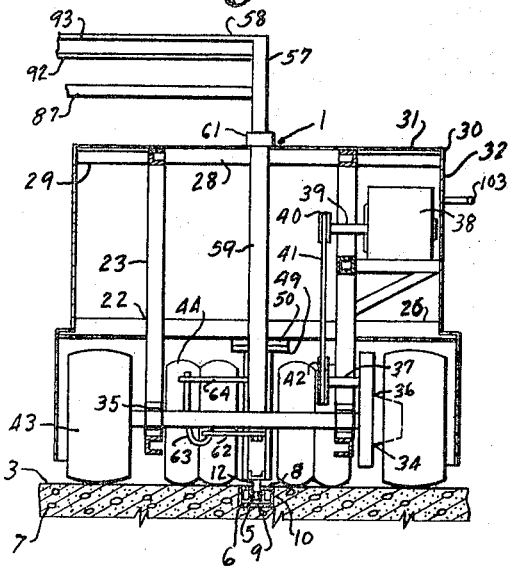
FIG. 5 is a vertical sectional view through the carriage taken on the line 5—5, FIG. 4.
Figure 6:
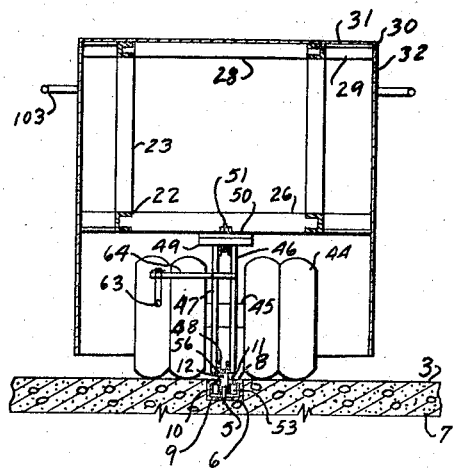
FIG. 6 is a vertical sectional view through the carriage taken on the line 6—6, FIG. 4.

While the operation of the pumps and the motor to drive the carriage may be controlled by manually operated switches, it is preferred that the structure be substantially automatic. In the structure illustrated, a housing 82 contains a coin-actuated mechanism of conventional structure including a meter wherein a coin introduced in a slot 83 may be rejected and returned to a return opening 84 or may be accepted and, if accepted, closes a switch to initiate action and operation of the apparatus, as later described. In order to place the coin mechanism in an accessible position to a driver of a vehicle 4, it is preferred that the housing 82 be movably mounted on the arm 58 and in an extended position, as illustrated in FIG. 2, prior to the receipt of a coin therein. The housing structure 82 includes a suitable frame 85 on which is mounted an enclosing shell 86 to enclose electrical equipment as well as the coin-actuated mechanism. In the illustrated structure, the arm 58 is generally in the shape of a rail or I-beam and mounted therebelow is a channel-shaped structure 87 which is connected to the post 57 and the spray unit portion 66 to provide a rigid structure. The frame 85 has depending members 88 and 89 on opposite sides of the arm 58 to mount rollers 90 and 91 respectively that engage the lower flange 92 and upper flange 93 on opposed sides of the beam shape of the arm 58, as illustrated in FIG. 4. The frame also has another member 94 that extends outwardly and mounts a roller 95 that engages a side edge of the channel 87 to provide lateral stability to the movable mounting of the housing 82 on the arm structure 58. The housing is moved from extended position as shown in solid lines in FIG. 2 to a retracted position shown in broken lines in said figure of the drawings, and the movement is effected by a drive wheel 96 frictionally engaging the upper surface 97 of the arm 58 and driven through a high ratio gear reduction reversible motor 98. The motor 98 and wheel assembly is pivotally mounted on a pin 99 carried by the frame 85 with a spring 100 having one end engaging an ear 101 on the frame 85 and the other end engaging the motor 98 to bias same around the pivot pin 99 to urge the drive wheel 96 into tight engagement with the surface 97 of the arm 58. The high ratio gear reduction, as for example a worm gear reduction, is such that the motor must be operated to move the housing and serves as a brake when the motor is de-energized to retain the motor 98 and housing 82 in the position that was acquired at the last operation of the motor 98. The circuit includes switches that are actuated at the end of the extent of movement of the housing 82 between the extended and retracted positions to effect reversing of the motor and movement, the switches being conventional and their operation in the circuit being later described.

The selected position for a vehicle 4 to be washed is with the front wheel at the inclined portion 19 of the forward end of the recess 17 and in that position there is a flexible tubular member 102 that is an actuator of a pressure responsive switch normally in circuit-interrupting position except when the tubular member 102 is compressed as by the weight of a vehicle wheel resting thereon so that the circuit to the equipment is interrupted until a vehicle is in place in the washing position, as later described.

The carriage has movably mounted thereon bars 103 and 104 that normally are extended from the casing 30 in the direction of travel of the carriage and are connected with switches whereby if they should either one strike an object the respective bar would be moved toward casing 30 and open a switch in the circuit to interrupt the circuit to all of the apparatus, stopping the sprays and the movement of the carriage.

Figure 9:
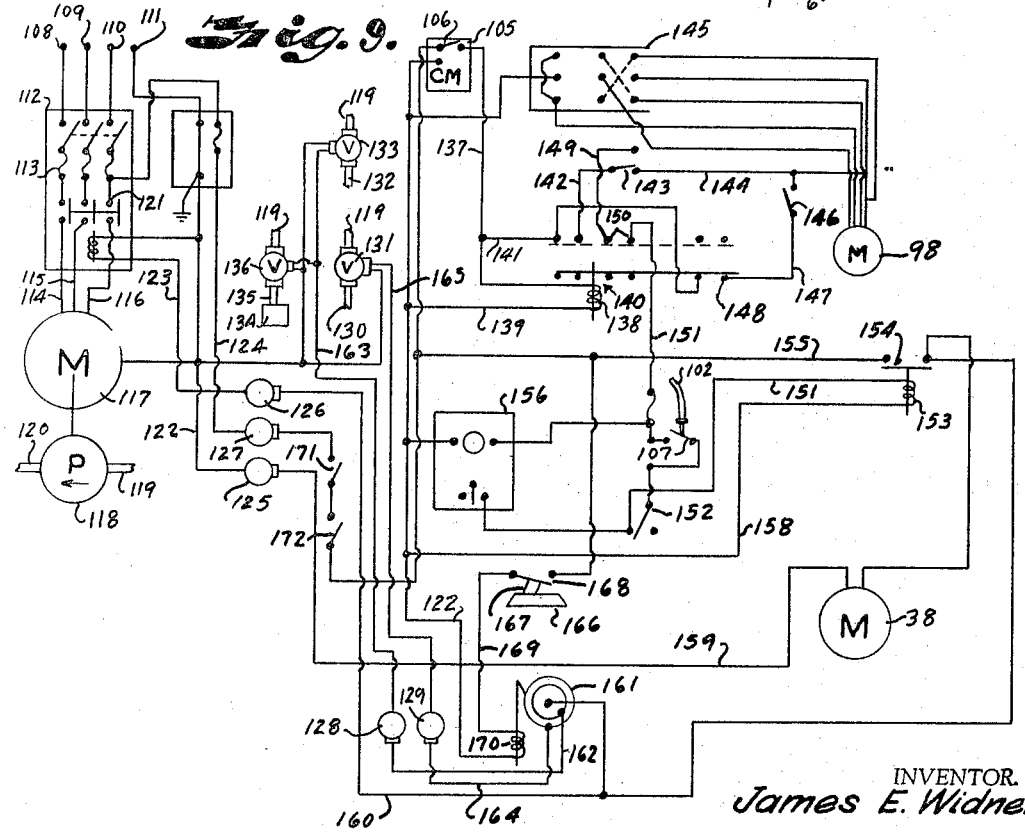
FIG. 9 is a diagrammatic view of the electrical circuitry for controlling the apparatus.

In the control of the apparatus, the coin mechanism or meter 105 in the housing 82 has a switch 106 that is closed in response to a coin being accepted by the coin meter. The circuit also has a pressure switch 107 arranged in the circuit and that is in circuit-making position only when the pressure tube 102 is under pressure as by being engaged by a wheel of the vehicle 4. The circuit includes leads 108, 109, 110 and 111 connected to a suitable source of current and extend to a master switch 112 which when closed provides current through suitable fuses 113 to conductors 114, 115 and 116 leading to a motor 117 that drives a pressure pump 118 having an inlet pipe 119 and a discharge 120 that is connected to the fluid flow pipe 76. The actual operation of the motor 117 is under control of a relay switch 121 which is normally in circuit-interrupting position and, when energized, effects closing of the circuit to the motor 117. The lead 111 is primarily a ground or return line and is connected by a conductor 122 to one side of the relay 121 to the housing of the motor 117, the coin meter housing 82, and other parts to form one side of the circuit or a ground of housing parts to prevent shock of any person contacting same. The conductor 122 extends through the conduit 75 along with a conductor 123 from the relay 121 and a conductor 124 from the master switch 112 at the fuse of the lead 110 all the connected through rotary contacts in the swivel connector 77, the rotary contacts indicated by numerals 125, 126 and 127 being for the conductors 122, 123 and 124 respectively to thereby provide continuations of the said conductors through the conduit portion 81 to the carriage 1. There are also additional rotary connectors 128 and 129 in the swivel member 77 to provide controls for water and detergent valves as later described. It is preferred that a source of cold water be connected through a flow conduit 130 to a solenoid valve 131, the discharge side being connected to the pump inlet pipe 119. Also, a source of hot water is supplied through a conduit 132 and solenoid valve 133 to the pipe 119. A detergent tank 134 supplies detergent through a conduit 135 and solenoid valve 136 to the pipe 119 so that upon selective operation of the valves detergent and water, or rinse water, can be supplied to the pump 118 and moved under pressure to the spray unit 2. With the master switch 112 closed and the relay switch 121 open, a vehicle is driven in the washing position engaging the pressure member 102, closing the switch 107. Then on dropping a suitable coin into the coin meter 105, and the coin being accepted, it closes the switch 106 whereby current flows from the lead 110, switch 112, conductor 124, and the rotary contacts 127 therein through the switch 106 to a conductor 137 to a relay coil 138 connected by a conductor 139 to the conductor 122 which is connected to the lead 111. This energizes the relay switch 140 having the coil 138 whereby said switch 140 is moved to a position shown in broken lines, FIG. 9, to complete a circuit from the conductor 137 through a conductor 141, switch 140, conductor 142, switch 143, conductor 144, to a reversing switch 145 which is in a position to complete the circuit to the reversing motor 98. This energizes the motor 98 to effect operation of the wheel 96 moving the housing 82 to a retracted position. As the housing reaches the retracted position, it actuates the switches 143 and 145 and also a switch 146, the switch 143 opening the circuit to the switch 145 and the motor 98 causing same to stop and the switch 146 moves to a closed position, this switch being in a conductor 147 that leads from the conductor 144 to a contact 148 of the relay switch 140, but that contact is open as the relay switch 140 is still in the position shown in the broken lines, FIG. 9. The switch 143 is moved to complete a circuit through a conductor 149 to contacts 150 and the through a conductor 151, switch 107 to a switch 152 that is in a circuit to a coil 153 of a relay switch 154 that controls a circuit in a conductor 155 that leads from the conductor 124 to the motor 38 that drives the carriage 1. A timer 156 is connected in circuit between the conductor 151 and the conductor 122 so that when the switch 143 is moved to complete the circuit to the conductor 151 the timer 156 is energized to initiate its operation for a predetermined time that will permit a predetermined number of orbits of the carriage around the vehicle to be washed. This time and also the switch 152 completes the circuit through a conductor 158 to the conductor 122 leading to the lead 111. This energizes the relay to close the switch 154 which completes a circuit to the motor 38, the other side of the motor being connected by a conductor 159 to the conductor 122 leading to the ground connection 111. The motor 38 then drives the carriage 1 to cause same to move along the track around the vehicle. Closing of the switch 154 also effects a circuit therethrough to a conductor 160 that is connected through the swivel connection 126 to the conductor 123 to energize the relay switch 121 to energize and complete the circuit to the motor 117 to drive the pump 118. Connected to the conductor 160 is a stepping relay switch 161 which in initial position completes a circuit through a conductor 162 that is in the conduit 81 connected through the rotary connector 128 respectively to conductor 163 that extends through the conduit 75, the conductor 163 being connected to the solenoid valve 136 for detergent and to the hot water valve 133 to effect opening of same whereby detergent and hot water are supplied to the pump inlet pipe 119 and delivered by the pump through the flow conduit to the spray unit 2 and is discharged through the spray nozzles 70 and 72 to the surface of the vehicle 4. The stepping relay switch has another connection to which circuit is completed on advancing through a predetermined number of steps. This connection is through a conductor 164 that is in conduit 81 and connected through the rotary connector 129 to a conductor 165 in the conduit 75 and connected to cold water valve 131. The circuit through the conductor 164 is open during the spraying of the detergent and hot water onto the vehicle so that the cold water valve remains closed. It is preferred that this operation continue and when the carriage reaches its initial position after the first orbit, a cam member 166 on the floor or track is engaged by a switch actuating member 167 to effect closing of a switch 168 and a circuit through a conduit 169 to the coil 170 of the stepping relay switch 161 to move same one step. Any desired number of orbits around the vehicle may be provided by the number of steps of the relay before a change in the operation. It is preferred that the carriage make two orbits; therefore, on the first orbit completion, the one step advance of the stepping relay will not change the operation and the detergent and hot water will continue to be sprayed during the second orbit. In each of these orbits, the guide means 5 on the carriage 1 turns the front wheels to steer same and also turns the post 57 and arm 58 to swing the spray unit 2 angularly rearwardly as the carriage moves around a corner to assure that all surfaces at the ends of the vehicle will be contacted by the sprays, the particular angular arrangement of the spray at said curves being shown in broken lines in FIG. 3. On completion of a second orbit or the predetermined number of orbits for the application of detergent and hot water, the stepping relay switch 161 advances to a position wherein the solenoid valves 133 and 136 are closed and the cold water valve 131 is opened to provide a rinse spray which is directed onto the vehicle as the carriage continues in further orbits. The switch 152 is opened momentarily at the same time the switch 168 is closed by engagement with the cam 166. On completion of the next to the last orbit, the timer 156 opens the circuit therethrough so that the switch 152 being closed during the last orbit maintains the relay switch 154 closed. When the last orbit is completed, the engagement of the switch operator of the switch 168 with the cam 166 closes said switch to move the stepping relay to its next position, when the circuit to the valve 131 is opened causing said valve to close. Also, the switch 152 is opened interrupting the circuit to the coil 153 so that the switch 154 moves to open position, interrupting the circuit to the carriage drive motor 38 and also to the pump motor 117. This causes the carriage to stop and the sprays to stop. The relay coil 138 is de-energized causing the switch 140 to move to its position as shown in solid lines in FIG. 9 whereby the circuit is completed from the conductor 145 through the contacts 148, conductor 147 and switch 146 and conductor 144 to the reversing switch 145 to again energize the motor 98 but to cause same to operate in the opposite direction to its initial movement so that the motor drives the housing 82 to move same to the extended position. When it reaches said extended position, switch 146 is opened to interrupt the circuit to the motor, the reversing switch 145 is reversed, and the switch 143 is moved to complete a circuit through the same from the conductor 142 to the conductor 144. However, that circuit is open due to the position of the switch 140. This completes the cycle until such time as another coin is placed in the coin meter to initiate another washing cycle. Safety switches 171 and 172 actuated by the bars 103 and 104 respectively are arranged in the circuit to interrupt the circuit and stop all operation in the event the bars come in contact with some object to provide for safety and avoid injury to persons and the like.

The apparatus described and illustrated may be placed in an open area; however, it is preferred that it be installed within a building (not shown) for the protection of the equipment. Also, the operator of the vehicle may remain inside of same, roll down his window, place a coin in the coin slot, and while the housing is being retracted before any spray is started, he can roll up his window so that no spray will be driven therein and in a minimum of washing time on completion of the washing and rinsing cycles, the driver may then drive the car out of the washing position into other service areas.

It is to be understood that while I have illustrated and described one form of my invention, it is not to be limited to the specific form or arrangement of parts herein described and shown except insofar as such limitations are included in the claims.

What I claim and desire to secure by Letters Patent is:
1. A vehicle washing apparatus consisting of,
 (a) a closed track on a supporting surface extending around a position of a vehicle to be washed,
 (b) a mobile frame having a plurality of wheels operatively engaging said supporting surface and forming the support for said frame, certain of said wheels being steerable and certain of said wheels being power driven, said wheels of the mobile frame being front and rear with said power driven wheels being in the rear and said steerable wheels being in the front, an assembly mounting said front wheels and swingable about a vertical axis, said frame including a depending guide means mounted on said front wheel assembly and movably engaged in said track to steer the mobile frame in an orbit as defined by said track about a vehicle in the wash position,
 (c) a spray unit carried by said mobile frame and having an upright portion disposed alongside of the wash position and a horizontal portion extending from the upright portion in upwardly spaced relation to a vehicle in the wash position, said spray unit being adapted to successively spray detergent and rinse water under pressure on a vehicle for cleaning same as the mobile frame is moved in the path defined by the track,
 (d) and means connected to said spray unit and operable in response to swinging movement of the front wheel assembly to turn the spray unit through an angle of rotation in accordance with the relative swinging movement of said front wheel assembly as it moves in a path defined by said track.

2. A vehicle washing apparatus as set forth in claim 1 wherein the track is endless and generally rectangular with curved corners and of a length and width greater than the vehicle to be washed whereby as the mobile frame moves in the path defined by said track it moves around a vehicle in the wash position and the spray unit is turned rearwardly as the mobile frame turns said corners.

3. A vehicle washing apparatus consisting of,
 (a) a closed track in a supporting surface extending around a position of a vehicle to be washed,
 (b) a mobile carriage having a plurality of laterally and longitudinally spaced wheels operatively engaging said supporting surface and forming the support for said carriage, certain of said wheels being steerable and certain of said wheels being power driven, said carriage including a depending guide means movably engaged in said track and operative to steer the carriage in a path defined by said track,
 (c) an arm movably mounted on said carriage and extending laterally thereof toward the vehicle wash position, means operatively connected to said arm to control the position thereof,
 (d) a spray unit supported on said arm and having an upright portion disposed alongside of the wash position and a horizontal portion extending from the upright portion in upwardly spaced relation to a vehicle in the wash position, said spray unit being adapted to successively spray detergent and rinse water under pressure on a vehicle for cleaning same as the carriage is moved in the path defined by said track.

4. A vehicle washing apparatus as set forth in claim 3 and including,
 (a) certain of said wheels are powered rear wheels on said mobile carriage,
 (b) other of said wheels being a front wheel assembly on said carriage and swingable about a vertical axis with the guide means mounted on said front wheel assembly to steer same as the carriage moves in an orbit as defined by said track about a vehicle in the wash position,
 (c) means rotatably mounting said arm on said carriage whereby the movable mounting swingably disposes the spray unit in laterally spaced relation to said carriage with the sprays normally directed in a curtain at right angles to the vehicle,
 (d) the means connected to said arm to control the position thereof being operable in response to swinging movement of the front wheel assembly to swing said arm and the spray unit supported thereby relative to said carriage in accordance with the relative swinging movement of said front wheel assembly as it moves in a path defined by said track.

5. A vehicle washing apparatus as set forth in claim 4 wherein the track is endless and generally rectangular with straight portions at sides and ends of the washing position connected by curved portions at the corners, said track being of a length and width greater than the vehicle to be washed whereby as the carriage moves in the path defined by said track it moves around a vehicle in the wash position and the spray unit is turned rearwardly as the carriage turns the corners and then back to a position wherein the spray curtain is at right angles to the vehicle body.

6. A vehicle washing apparatus comprising,
(a) a carriage having a generally rectangular frame and a plurality of wheels secured to said frame to support the same for rolling movement over a surface,
(b) a track mounted in said surface and extending around a position of a vehicle to be washed to define an endless path therearound,
(c) a spray unit having a generally L-shaped arrangement of spray nozzles with one portion adapted to extend above and partly across the vehicle and a second portion extending downwardly therefrom alongside of the vehicle being washed,
(d) means on the carriage supporting the spray unit,
(e) a drive motor operatively connected to certain of said wheels to propel the carriage,
(f) means engaging the track to guide the carriage in an orbit about a vehicle to be washed as defined by said track,
(g) a housing including a coin-controlled mechanism,
(h) means including an electric circuit actuated in response to receipt of a coin in the coin mechanism and switch means for actuating the apparatus and energizing the driving motor to rotate the wheels and move the frame in the orbit about the vehicle for successively spraying detergent and rinse water under pressure on a vehicle for cleaning same,
(i) and means responsive to a predetermined number of orbits of the frame about a vehicle position to interrupt the circuit to the drive motor and effect movement of the housing to an extended position adjacent the vehicle position.

7. A vehicle washing apparatus comprising,
(a) a carriage having a generally rectangular frame and a plurality of wheels secured to said frame to support the same for rolling movement over a surface,
(b) a track mounted in said surface and extending around a position of a vehicle to be washed to define an endless path therearound,
(c) an arm mounted on said carriage and positioned above the frame and extending toward the position of a vehicle to be washed,
(d) a spray unit having a generally L-shaped arrangement of spray nozzles with one portion adapted to extend above and partly across the vehicle and a second portion extending downwardly therefrom alongside of the vehicle being washed,
(e) means supporting the spray unit from said arm,
(f) a drive motor operatively connected to certain of said wheels to propel said carriage,
(g) means engaging said track to guide the carriage in the path defined by said track,
(h) a housing including a coin-controlled mechanism,
(i) means movably mounting said housing on said arm for movement toward and away from a vehicle to be washed,
(j) means including an electric circuit actuated in response to receipt of a coin in the coin mechanism to move said housing from an extended position adjacent said vehicle washing position and including a switch means responsive to the housing reaching a retracted position for actuating the apparatus and energizing the driving motor to rotate the wheels and move the frame in the orbit about the vehicle for successively spraying detergent and rinse water under pressure on a vehicle for cleaning same,
(k) and means responsive to a predetermined number of obits of the frame about a vehicle position to interrupt the circuit to the drive motor and effect movement of the housing to an extended position adjacent to the vehicle position.

8. A vehicle washing apparatus comprising,
(a) a carriage having generally rectangular frame and a plurality of wheels secured to said frame to support the same for rolling movement over a surface,
(b) a track mounted in said surface and extending around a position of a vehicle to be washed to define an endless generally rectangular path along the sides and ends of a vehicle position with straight portions thereof connected by curved portions at the corners,
(c) an upright post mounted on said frame for rotation about a vertical axis,
(d) an arm secured to said post above the frame and extending toward the position of a vehicle to be washed,
(e) a spray unit having a generally L-shaped arrangement of spray nozzles with one portion adapted to extend above and partly across the vehicle and a second portion extending downwardly therefrom alongside of the vehicle being washed,
(f) means securing the spray unit to said arm for swinging movement of the spray unit in response to rotation of the post,
(g) a drive motor operatively connected to certain of said wheels to propel said carriage,
(h) means movable in the track and connected to certain of the wheels to steer the frame in an orbit about a vehicle to be washed as defined by said track,
(i) means connected to said post and responsive to the guide means and the wheels steered thereby in turning a corner to swing the spray unit whereby the direction of the sprays are moved from a plane normal to the path of movement of the frame to an angle rearwardly thereof substantially corresponding to the steering movement of said certain wheels,
(j) a housing including a coin-controlled mechanism,
(k) means including an electric circuit actuated in response to receipt of a coin in the coin mechanism and switch means for actuating the apparatus and energizing the driving motor to rotate the wheels and move the frame in the orbit about the vehicle for successively spraying detergent and rinse water under pressure on a vehicle for cleaning same,
(l) and means responsive to a predetermined number of orbits of the frame about a vehicle position to interrupt the circuit to the drive motor and effect movement of the housing to an extended position adjacent the vehicle position.

9. A vehicle washing apparatus comprising,
(a) a carriage having generally rectangular frame and a plurality of wheels secured to said fram to support the same for rolling movement over a surface,
(b) a track mounted in said surface and extended around a position of a vehicle to be washed to define an endless generally rectangular path along the sides and ends of a vehicle position with straight portions thereof connected by curved portions at the corners,
(c) an upright post mounted on said frame for rotation about a vertical axis,
(d) an arm secured to said post above the frame and extending laterally toward the position of a vehicle to be washed,
(e) a spray unit having a generally L-shaped arrangement of spray nozzles with an upper portion adapted to extend above and partly across the vehicle and an upright portion extending downwardly therefrom alongside of the vehicle being washed,
- (f) means securing the spray unit to said arm for swinging movement of the spray unit in response to rotation of the post,
- (g) a drive motor operatively connected to certain of said wheels to propel said carriage,
- (h) means movable in the track and connected to other of the wheels to steer the frame in an orbit about a vehicle to be washed as defined by said track,
- (i) means connected to said post and responsive to the guide means and the wheels steered thereby in turning a corner to swing the spray unit whereby the direction of the sprays are moved from a plane normal to the path of movement of the frame to an angle rearwardly thereof substantially corresponding to the steering movement of said certain wheels,
- (j) a casing on said frame and forming an enclosure,
- (k) a housing including a coin-controlled mechanism,
- (l) means movably mounting said housing on said arm for movement toward and away from a vehicle to be washed,
- (m) means including an electric circuit actuated in response to receipt of a coin in the coin mechanism to move said housing from an extended position adjacent said vehicle washing position and including a switch means responsive to the housing reaching a retracted position for actuating the apparatus and energizing the driving motor to rotate the wheels and more the frame in the orbit about the vehicle for successively spraying detergent and rinse water under pressure on a vehicle for cleaning same,
- (n) and means responsive to a predetermined number of orbits of the frame about a vehicle position to interrupt the circuit to the drive motor and effect movement of the housing to an extended position adjacent the vehicle position.

10. A vehicle washing apparatus consisting of,
- (a) a closed track on a supporting surface extending around a position of a vehicle to be washed,
- (b) a mobile frame having a plurality of wheels operatively engaging said supporting surface and forming the support for said frame, certain of said wheels being steerable and certain of said wheels being power driven, the steerable wheels being swingable about a vertical axis, said frame including a depending guide means movably engaged in said track and operatively connected with said steerable wheels to steer the mobile frame in a path defined by said track,
- (c) a spray unit rotatably mounted on the mobile frame and having an arrangement of a plurality of spray nozzles with one portion being generally upright and disposed alongside of the wash position and a second portion spaced above and extending partly across the vehicle in the wash position, said spray unit being adapted to successively spray detergent and rinse water under pressure on a vehicle for cleaning same as the mobile frame is moved in the path defined by the track,
- (d) and means connected to said spray unit and operable in response to swinging movement of the steerable wheels to turn the spray unit through an angle of rotation in accordance with the relative swinging movement of the steerable wheels as it moves in a path defined by said track.

References Cited by the Examiner
UNITED STATES PATENTS

| | | | |
|---|---|---|---|
| 2,752,825 | 7/1956 | Friers | 134—123 |
| 2,896,857 | 7/1959 | Tompkins | 134—123 X |
| 3,107,676 | 10/1963 | Thorson et al. | 134—123 X |
| 3,167,797 | 2/1965 | Hergonson | 134—123 X |
| 3,208,088 | 9/1965 | Sulzberger. | |

FOREIGN PATENTS 717,025  10/1954  Great Britain.

CHARLES A. WILLMUTH, *Primary Examiner.*

R. L. BLEUTGE, *Assistant Examiner.*